(12) United States Patent
Johnson

(10) Patent No.: US 6,479,088 B1
(45) Date of Patent: *Nov. 12, 2002

(54) METHOD FOR REFINING PEPPERMINT OIL

(75) Inventor: Sonya S. Johnson, LaGrange Highlands, IL (US)

(73) Assignee: Wm. Wrigley Jr. Company, Chicago, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,005

(22) Filed: Sep. 24, 1999

Related U.S. Application Data

(60) Provisional application No. 60/108,053, filed on Nov. 12, 1998.

(51) Int. Cl.⁷ .............................................. A23L 1/222
(52) U.S. Cl. ....................................................... 426/492
(58) Field of Search ................................ 426/492, 651, 426/3, 487, 534

(56) References Cited

U.S. PATENT DOCUMENTS

| | | | |
|---|---|---|---|
| 3,083,105 A | * 3/1963 | Todd ........................... | 426/651 |
| 4,613,513 A | 9/1986 | Hussein ....................... | 426/651 |
| 4,708,880 A | 11/1987 | Hussein ....................... | 426/424 |
| 4,889,726 A | 12/1989 | Dave et al. ..................... | 426/3 |
| 4,948,595 A | 8/1990 | Patel et al. .................... | 426/3 |
| 4,980,169 A | 12/1990 | Oppenheimer et al. ...... | 424/439 |
| 5,030,459 A | 7/1991 | Barcelon et al. ............... | 426/3 |
| 5,041,294 A | 8/1991 | Patel .............................. | 426/3 |
| 5,116,625 A | 5/1992 | Patel et al. .................... | 426/3 |
| 5,128,154 A | 7/1992 | Johnson et al. ................ | 426/3 |
| 5,204,128 A | 4/1993 | Johnson ......................... | 426/3 |
| 5,286,500 A | 2/1994 | Synosky et al. ................ | 426/3 |
| 5,298,238 A | 3/1994 | Hussein et al. ................ | 424/49 |
| 5,372,824 A | 12/1994 | Record et al. ................. | 426/3 |
| 5,425,962 A | 6/1995 | Johnson et al. ................ | 426/3 |

FOREIGN PATENT DOCUMENTS

| | | |
|---|---|---|
| GB | 1 212 360 | 11/1970 |
| WO | WO 90/00547 | 1/1990 |
| WO | WO 90/06689 | 6/1990 |

\* cited by examiner

*Primary Examiner*—Arthur L. Corbin
(74) *Attorney, Agent, or Firm*—Bell, Boyd & Lloyd LLC

(57) ABSTRACT

The present invention provides a method for refining peppermint oil containing compositions. Additionally, the present invention provides a method for making chewing gum having a peppermint flavor. To this end, a method for refining a peppermint oil and menthofuran containing composition that includes sulfur compounds to remove at least a portion of the sulfur compounds and menthofuran is provided. The method comprises the step of subjecting the composition to a distillation process that removes at least a portion of the sulfur compounds and menthofuran from the composition.

30 Claims, No Drawings

METHOD FOR REFINING PEPPERMINT OIL

This application claims the benefit of Ser. No. 60/108,053 filed Nov. 12, 1998.

BACKGROUND OF THE INVENTION

The present invention relates generally to mint flavors. More specifically, the present invention relates to methods for refining mint flavors and using same in chewing gum.

It is known in the chewing gum industry to add mint flavoring to chewing gum. For example, it is known to add peppermint oil to chewing gum. In addition to adding desirable taste characteristics to the chewing gum, such mint flavoring can add perceived breath freshening properties.

A number of mint flavored chewing gums, however, have a tendency to produce bitter flavor notes in the latter part of a chew. This is due, in part, to the fact that most, if not all, of the sweetness properties have been dissipated. This causes more of the mint flavor to become apparent, as well as the bitterness.

One method for reducing bitterness is disclosed in U.S. Pat. No. 5,372,824, entitled: "MINT FLAVORED CHEWING GUM HAVING REDUCED BITTERNESS AND METHODS FOR MAKING SAME." In that patent, a method is provided for producing mint flavored chewing gums having reduced bitterness. In part, that patent discloses a chewing gum including a water insoluble base portion, a water soluble portion, and a mint flavor agent from which at least a portion of 1-menthol has been removed.

Other patents and patent applications have considered modifying the formulation of chewing gum to deal with the undesirable properties of mint flavoring. These patents and published PCT patent applications include: U.S. Pat. Nos. 4,948,595; 4,889,726; 5,041,294; 5,128,154; 4,708,880; 4,980,169; 4,613,513; PCT 90-006689; and PCT 91-00547.

Another issue raised by mint flavor oils, such as peppermint oil, is that initially they typically include sulfur containing compounds such as dimethyl sulfide. In attempting to create a more palatable peppermint oil, usually, peppermint oil compositions are distilled to remove dimethyl sulfide and other sulfur compounds. Typically, distillations of peppermint oil are performed by steam distillation. However, such distillation processes are not entirely satisfactory.

U.S. Pat. No. 5,425,962 discloses the use of vacuum distillation to remove dimethyl sulfide.

Typically peppermint oil contains menthofuran. Menthofuran reduces palatability. Peppermint oil comprises about 1–8% menthofuran which has a tendency to oxidize and polymerize which will lower the quality of the mint oil.

Peppermint oils that contain high levels of menthofuran are considered lower in quality, whereas peppermint oils that are low in menthofuran are considered high quality oils. Menthofuran adds a distinctive heavy diesel flavor note to mint oils that is not desirable.

The typical steam distillation process in addition to removing sulfur containing components also removes desirable low boiling point peppermint oil components. For example, 3-methylbutanal is a desirable component of most peppermint flavors; 3-methylbutanal imparts creamy, chocolate notes to the flavor. Due to its low boiling point, steam distillation also removes 3-methylbutanal in addition to other desirable components. Typical steam distillation also does not remove menthofuran.

An additional problem with most currently used methods of refining peppermint oil is that they may subject the peppermint oil to excessive heat history. This can produce undesirable changes in the flavor; for example, excessive distillation can create still notes.

Further, steam distillation leaves substantial quantities of water in the flavor. This water must be removed. This adds a further step to the distillation process.

There is therefore a need for an improved method for refining peppermint oil to remove dimethyl sulfide and menthofuran.

SUMMARY OF THE INVENTION

The present invention provides improved methods for refining peppermint oil containing compositions. Additionally, the present invention provides improved methods for making chewing gum having a peppermint flavor.

To this end, a method for refining a peppermint oil containing composition that includes sulfur compounds to remove at least a portion of the sulfur compounds is provided. The method comprises the step of subjecting the composition to a distillation process that removes at least 50% of the menthofuran contained in the peppermint oil.

In an embodiment, less than 15% of peppermint oil composition is removed which contains both sulfur compounds and menthofuran.

In an embodiment, the composition consists essentially of peppermint oil. In an embodiment, more than 0.25% of the composition that contain sulfur compounds is removed by the distillation process.

In a further embodiment, the pressure during the vacuum distillation process is reduced to no more than 150 mmHg.

In a further embodiment, the temperature of the composition during the distillation process does not exceed 120° C.

In an embodiment, after the distillation process, the composition includes not more than 75 ppm dimethyl sulfide.

In an embodiment, after the distillation process, the composition includes not more than 2% menthofuran.

In an embodiment, the method includes the step of agitating a distillation pot including the composition during the distillation process.

In an embodiment, the method includes the step of blanketing a distillation pot including the composition with an inert gas during the distillation process.

In an embodiment, the level of 3-methylbutanal in the composition after distillation is not reduced below 100 ppm.

The present invention also provides a method for creating a peppermint flavor chewing gum comprising the steps of adding to an insoluble gum base portion and a water soluble portion a peppermint oil that has been refined by subjecting a peppermint oil containing composition to a vacuum distillation process for a sufficient time and at sufficient parameters to achieve at least approximately 50% reduction of the menthofuran in the peppermint oil.

In an embodiment, the present invention provides a method for refining peppermint oil comprising the steps of subjecting a peppermint oil containing composition to a vacuum distillation process wherein the pressure is reduced to less than or equal to 150 mmHg and the composition is not subjected to a temperature greater than 140° C. and removing during the process sufficient dimethyl sulfide that may be present to provide a refined peppermint oil having a dimethyl sulfide content of less than 75 ppm and a menthofuran content of less than 2%.

An advantage of the present invention is that it provides an improved method for refining mint oil, such as peppermint oil.

Another advantage of the present invention is that it provides a method for providing refined peppermint oil for use in creating chewing gum.

Furthermore, an advantage of the present invention is that it provides a method for creating mint flavored chewing gum.

Additionally, an advantage of the present invention is that it provides an improved peppermint flavored chewing gum.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides an improved method for refining peppermint oil and peppermint oil containing-compositions. Additionally, the present invention provides an improved method for making chewing gum including peppermint oil.

Pursuant to the present invention, a method is provided for refining peppermint oil and peppermint oil blends to remove sulfur compounds and menthofuran, while returning desirable low boiling point components to the undistilled fraction. Although, in an embodiment of the present invention, the peppermint oil can be used in the production of chewing gum, the present invention will have applications to the production of other mint flavored products, such as mint flavored confectionery products.

The present invention can be used to refine not only compositions that consist essentially of peppermint oil, but compositions that include a blend of peppermint oil and other flavors or mint oils. In this regard, the peppermint oil composition may include other flavors, such as spearmint oil.

Pursuant to the present invention, a method for refining peppermint oil, or peppermint oil blends, to remove sulfur components and menthofuran is provided comprising the step of subjecting the flavor to a distillation. Preferably, a batch vacuum distillation process is used.

Using the vacuum process, the vacuum distillation is performed at relatively low temperatures over a short period of time to remove the first approximate 0.25% to about 3% of the distillate, preserving the monoterpenes distilled off between the dimethyl sulfide and menthofutan and removing a significant portion of menthofuran. In a preferred embodiment, not more than 2% of the first distillate is removed. As the vacuum distillation process continues, desirable monoterpenes and low molecular weight low boilers such as 3-methylbutanal are removed. This low boiler distillate is about 8–15% of the peppermint oil and is removed and reserved. Continued distillation will then remove menthofuran in the next 2–10% of the next distillate and can be discarded. At this point the vacuum distillation can be stopped and the remaining 75–90% of non-distilled peppermint oil can be combined with the reserved low boiler distillate to obtain a rectified or refined natural peppermint oil.

The refined oil will have a reduced menthofuran level. If a high menthofuran peppermint oil such as 5–8% weight was distilled, then the level will be reduced to less than about 2.5–4% weight. If a low menthofuran peppermint oil, such as 1–3% weight, was distilled, the menthofuran level will be reduced to less than about 0.5 to 1.5% weight. At least 50% of the menthofuran can be removed by vacuum distillation after the low boilers are removed. Continued distillation results in removal of the menthofuran fraction, and then recombining the low boiling fraction with the remaining undistilled peppermint fraction.

During the distillation process, a vacuum is created that reduces the pressure during the process to less than or equal to 150 mmHg. Preferably, it has been found that the pressure should be reduced to less than 100 mm and most preferably, less than 60 mmHg. However, in a most preferred embodiment, the pressure is reduced to less than or equal to 30 mmHg. In a further preferred embodiment, the pressure is reduced to less than or equal to 15 mmHg.

During the distillation process, in order to prevent degradation of the flavor components while insuring efficient distillation, the temperature of the oil being distilled should not exceed approximately 140° C. Preferably, the temperature of the oil will not exceed approximately 100° C. for any extended period of time. However, it should be noted that it is acceptable for the temperature to briefly, e.g., less than approximately 50% of the total distillation time, exceed these temperatures before cooling procedures are initiated to prevent thermal degradation.

It is believed that separation effectiveness is necessary to practice the vacuum distillation of the present invention. It is possible that fractionating columns or other apparatuses having at least 3–4 theoretical plates are needed to be effective. Of course, columns with more theoretical plates can also be used.

The distillation pot containing the oil to be refined should be agitated during the process. This will prevent degradation that can be caused by uneven heating and other problems. A number of means can be used for agitating the distillation pot. Such means include using mechanically or magnetically driven impellers or bubbling inert gas into the oil. Other means, however, can also be used.

In an embodiment, to reduce oxidation which can occur during the distillation process, the distillation pot can be blanketed with an inert gas, such as nitrogen. This is especially useful when the vessel is repressurized after completing the distillation.

In performing the process of the present invention using stills having an adjustable reflux apparatus, the reflux setting will be determined by the characteristics of the distillation apparatus being used. With some equipment, it may be desirable to set the reflux to a high return ratio until the desired starting temperature and pressure are reached. However, the apparatus will normally be set to a high collection ratio once the distillation process begins.

As previously noted, typically, dimethyl sulfide is present in peppermint oil at levels from 100 to 1,000 ppm (parts per million by weight). In an embodiment, the first portion of the vacuum distillation process can be run until the undistilled portion includes less than 75 ppm of dimethyl sulfide. It has been determined, through sensory testing, that peppermint oil having levels of dimethyl sulfide greater than 75 ppm are negatively perceived by experienced judges as compared to peppermint oil having less than 75 ppm dimethyl sulfide.

As noted above, one desirable constituent that imparts creamy, chocolate notes to the peppermint flavor is 3-methylbutanal. This compound normally occurs in peppermint oil, prior to any refining process, at levels of approximately 400 to about 1,000 ppm by weight. The distillation process of the present invention should not reduce the level of this component below 100 ppm and preferably, not below 200 ppm. Indeed, it has been found that the method of the present invention can create refined peppermint oil including 3-methylbutanal at a level of 250 ppm or greater.

To determine the end point of the first portion of the distillation process, a variety of methods can be used. One method is to use a sulfur detector in the distillation pot to directly measure dimethyl sulfide levels. When the desired reduction in dimethyl sulfide is reached, the collected distillate is removed and discarded and the distillation process is continued.

If desired, a number of trial distillations can be used to determine how much distillate should be collected in the receiver to achieve the desired reduction of dimethyl sulfide while maintaining high levels of 3-methylbutanal. These trial distillations should also give the amount of distillation to obtain the low boiler distillate and the menthofuran distillate. The amount of distillate that must be collected will probably vary with the design and scale of the equipment used, as well as the initial dimethyl sulfide level and menthofuran level and to a lesser extent, the amount of water in the undistilled flavor. It may also desirable to establish a steady state condition in the still by running at least one or two batches to wet the initial surfaces of the distillation apparatus.

Pursuant to the present invention, a good quality peppermint oil will yield 90% to 97% refined oil in a steady state batch process. In addition to the distillate removed, losses may include material loss to the vacuum pump and trap and other equipment areas. Additionally, in the first batch or two, material used to wet the internal surfaces of the distillation apparatus will also be lost.

By way of example, and not limitation, examples of distillation processes will now be given:

EXAMPLE 1

A nominal 600 pound vacuum still equipped with a still pot can be used. The pot is glass lined and jacketed for steam heating and tap water cooling. A mechanically driven propeller for agitation is located in the pot. An eight inch diameter by 4.5 foot long fractionating column packed with stainless steel Heliapack® which has 4 to 6 theoretical plates of separation at full equilibration can be used, as well as an adjustable reflux apparatus.

A 400 pound quantity of blended field distilled peppermint oil can be used in the following process. The oil contains 1.3% water, 75 ppm dimethyl sulfide, and 6% menthofuran.

At zero time, the peppermint oil can be charged into the pot which is at 8 mm absolute pressure, oil temperature 29° C., vapor temperature 20° C., reflux set at 100%, and steam on full and continue to apply heat. When liquid is noted on the reflux sight glass, switch to 100% collect and continue to collect the fraction until 40–60 pounds of low boiling components can be collected. These are the low boiling components that will contain the low level of dimethyl sulfide, 3-methyl butanaol, and monoterpenes.

After the low boiling components are collected and the temperature increases to about 80° C.–90° C. at about 10 to 15 mm vacuum, the menthofuran fraction can be collected. The next 6% or 24 pounds of menthofuran can be collected and discarded. The remaining oil in the pot can be cooled to room temperature and combined with the first 40–60 pound fraction of low boilers. This would give a refined peppermint oil with about 75 ppm dimethyl sulfide and less than about 2% menthofuran.

EXAMPLE 2

The same equipment used in Example 1 can be used in this example. In this example, both dimethyl sulfide and menthofuran are removed by the vacuum distillation process. 400 pounds of blended field distilled peppermint oil is placed in the still pot. The peppermint oil contains about 1.7% water, 200 ppm dimethyl sulfide and 5% menthofuran.

At zero time, the peppermint oil can be charged into the pot which is at 8 mm absolute pressure, oil temperature at 29° C., vapor temperature at 20° C., reflux set at 100% with steam on fill and continue to apply heat. When liquid is noted on the reflux sight glass, switch to 100% collect, and collect the first 2% in about 6–8 pounds of distillate. This first distillate will contain most of the dimethyl sulfide and can be discarded. The temperature of the oil is about 70° C., vapor temperature of 20° C., vacuum of about 10 mm. The vacuum distillation process can then be continued.

Temperature of the mint oil will increase gradually to about 80° C., and about 32–60 pounds or about 8–15% of the low boiling components, monoterpene, fraction, can be collected as in Example 1, and saved. At this point, which has been predetermined based on analytical tests, menthofuran starts to collect at about 80–90° C., under 10–15 min vacuum, about 24 pounds or about 6% of this distillate is collected and removed.

After the menthofuran is removed, the remaining mint oil in the pot can be cooled to room temperature and combined with the 32–60 pounds of low boiling components. This would give a clean refined peppermint oil with less than about 75 ppm dimethyl sulfide and less than about 2% menthofuran.

Pursuant to the present invention, the refined peppermint oil can be used to create chewing gum. In this regard, the present invention also provides a mint flavor chewing gum comprising a water insoluble base portion, a water soluble base portion, and a mint flavor agent refined pursuant to the present invention. The chewing gum may be any of a variety of different chewing gums, including low or high moisture, sugar or sugarless, wax-containing or wax-free, low calorie and/or a chewing gum that includes dental health agents.

Chewing gum generally consists of a water insoluble gum base, a water soluble portion, and flavors. The water soluble portion dissipates with a portion of the flavor over a period of time during chewing. The gum base portion is retained in the mouth throughout the chew.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum base of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing, the preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5 to about 15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sugarless sweeteners include, but are not limited to, sugar alcohols such as sorbitol, mannitol, xylitol, hydrogenated starch hydrolysates, maltitol, and the like, alone or in combination.

High intensity artificial sweeteners can also be used, alone or in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used in combination with the refined mint flavor of the present invention. The flavor, which may only include the refined mint flavor, can be used in amounts of approximately 0.1 to about 10 weight percent of the gum, and preferably, 0.3 to 2%. Flavoring agents may include essential oils, synthetic flavors or mixtures thereof including, but not limited to, oils derived from plants and fruits. In addition to peppermint oil, mint oils include spearmint oil, as well as other mint oils. Artificial flavoring agents and components may also be used. Natural and artificial flavoring agents may be combined in any sensorially acceptable fashion.

Peppermint oils with high levels of menthofuran are considered low in quality and give mint a diesel, heavy off taste that is not desirable. These mint oils have a tendency to oxidize more readily, and give mint oils a harsh, but minty taste. Low menthofuran oils are higher quality and give products a clean, more refreshing taste.

The refined peppermint oil with dimethyl sulfide and menthofuran removed, prepared pursuant to the method of the above Example 2, can be compared to the same oil which was steam distilled according to the prior art practice. To this end, an analysis that can be performed is to use sweet water solutions (comprising 5% sucrose and ethanol as a cosolvent) containing the above refined peppermint oils that are evaluated by trained panelists. In these sweet solution tests, it is believed that the inventive peppermint oil would have a cleaner more refreshing mint taste with less "green" peppermint top notes. The inventive mint oil would have a more creamy, chocolate character and would have a higher quality.

If the mint oil prepared pursuant to the method of the above Example 2 were compounded into chewing gum, it is believed that the inventive oil would be considered a high quality, high priced giving chewing gum a clean, minty, sweet taste with less sharpness or biting character.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A method for refining a peppermint oil containing composition that includes menthofuran to remove at least a portion of the menthofuran comprising the steps of:
    subjecting the composition to a single distillation step that removes a action of low boiling compounds;
    continuing the single distillation step to remove at least 50% of the menthofuran of the composition; and
    recombining the fraction of low boiling compounds with the remaining non-distilled peppermint oil composition.

2. The method of claim 1 wherein the composition consists essentially of peppermint oil.

3. The method of claim 1 wherein the composition is subjected to a vacuum distillation step.

4. The method of claim 3 wherein the pressure during the vacuum distillation step is reduced to less than or equal to 150 mmHg.

5. The method of claim 3 wherein the pressure during the vacuum distillation step is reduced to less than or equal to 60 mmHg.

6. The method of claim 3 wherein the pressure during the vacuum distillation step is reduced to less than or equal to 30 mmHg.

7. The method of claim 3 wherein the pressure during the vacuum distillation step is reduced to less than or equal to 15 mmHg.

8. The method of claim 1 wherein after the distillation step, the composition includes not more than 75 ppm dimethyl sulfide.

9. A method for refining a peppermint oil containing composition that includes sulfur compounds and menthofuran to remove at least a portion of the sulfur compounds and menthofuran comprising the steps of:
    subjecting the composition to a single distillation step that removes at least a portion of the sulfur compounds but not more than approximately 3% of the composition;
    continuing the single distillation step and removing a fraction of low boiling compounds, and removing a fraction that contains at least 50% by weight of the menthofuran in the composition; and
    recombining the fraction of low boiling compounds with the remaining non-distilled peppermint oil composition.

10. The method of claim 9 including the step of agitating a distillation pot including the composition during the distillation step.

11. The method of claim 9 including the step of blanketing a distillation pot inducing the composition with an inert gas during the distillation step.

12. The method of claim 9 including the step of using during the distillation step a fractionating column including at least one theoretical plate.

13. The method of claim 9 wherein the level of 3-methylbutanal in the composition after the distillation step is not reduced below 100 ppm.

14. The method of claim 9 wherein the level of 3-methylbutanal in the composition after the distillation step is not reduced below 250 ppm.

15. The method of claim 9 wherein the composition is subjected to a batch vacuum distillation step.

16. A method for refining a peppermint oil containing composition that includes menthofuran to remove at least a portion of the menthofuran comprising the steps of:
    subjecting the composition to a single distillation process that removes a fraction of low boiling compounds;
    continuing the single distillation process to remove at least 50% of the menthofuran of the composition; and
    recombining the fraction of low boiling compounds with the remaining non-distilled peppermint oil composition.

17. The method of claim 16 wherein the composition consists essentially of peppermint oil.

18. The method of claim 16 wherein the composition is subjected to a vacuum distillation process.

19. The method of claim 18 wherein the pressure during the vacuum distillation process is reduced to less than or equal to 150 mmHg.

20. The method of claim 18 wherein the pressure during the vacuum distillation process is reduced to less than or equal to 60 mmHg.

21. The method of claim 18 wherein the pressure during the vacuum distillation process is reduced to less than or equal to 30 mmHg.

22. The method of claim 18 wherein the pressure during the vacuum distillation process is reduced to less than or equal to 15 mmHg.

23. The method of claim 16 wherein after the distillation process, the composition includes not more than 75 ppm dimethyl sulfide.

24. A method for refining a peppermint oil containing composition that includes sulfur compounds and menthofuran to remove at least a portion of the sulfur compounds and menthofuran comprising the steps of:
    subjecting the composition to a single distillation process that removes at least a portion of the sulfur compounds but not more than approximately 3% of the composition;
    continuing the single distillation process and removing a fraction of low boiling compounds, and removing a fraction that contains at least 50% by weight of the menthofuran in the composition; and recombining the fraction of low boiling compounds with the remaining non-distilled peppermint oil composition.

25. The method of claim 24 including the step of agitating a distillation pot including the composition during the distillation process.

26. The method of claim 24 including the step of blanketing a distillation pot including the composition with an inert gas during the distillation process.

27. The method of claim 24 including the step of using during the distillation process a fractionating column including at least one theoretical plate.

28. The method of claim 24 wherein the level of 3-methylbutanal in the composition after the distillation process is not reduced below 100 ppm.

29. The method of claim 24 wherein the level of 3-methylbutanal in the composition after the distillation process is not reduced below 250 ppm.

30. The method of claim 24 wherein the composition is subjected to a batch vacuum distillation process.

\* \* \* \* \*